(12) United States Patent
Carlson et al.

(10) Patent No.: US 7,686,715 B2
(45) Date of Patent: Mar. 30, 2010

(54) HYBRID CLAMPING MECHANISM FOR BELT CONTINUOUSLY VARIABLE TRANSMISSION AND METHOD OF USE THEREOF

(75) Inventors: Richard W. Carlson, Warren, MI (US); Burak A. Gecim, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1054 days.

(21) Appl. No.: 10/886,722

(22) Filed: Jul. 8, 2004

(65) Prior Publication Data

US 2006/0009321 A1    Jan. 12, 2006

(51) Int. Cl.
*F16H 59/00* (2006.01)
*F16H 61/00* (2006.01)
*F16H 63/00* (2006.01)

(52) U.S. Cl. .............................. 474/28; 474/18; 474/46; 474/70

(58) Field of Classification Search ................... 474/18, 474/28, 46, 17, 29, 30, 70
See application file for complete search history.

(56) References Cited

U.S. PATENT DOCUMENTS

| | | | | |
|---|---|---|---|---|
| 2,313,436 A | * | 3/1943 | Hennessy | 474/46 |
| 5,221,235 A | * | 6/1993 | Ogawa | 474/25 |
| 5,776,022 A | * | 7/1998 | Schellekens | 474/18 |
| 6,012,998 A | * | 1/2000 | Schutz et al. | 474/43 |
| 6,234,925 B1 | * | 5/2001 | Walter | 474/18 |
| 6,336,878 B1 | * | 1/2002 | Ehrlich et al. | 474/28 |
| 6,342,024 B1 | * | 1/2002 | Walter et al. | 475/210 |
| 6,464,603 B1 | * | 10/2002 | Reuschel et al. | 474/28 |
| 6,565,465 B2 | * | 5/2003 | Nishigaya et al. | 474/28 |
| 2001/0044350 A1 | * | 11/2001 | Nishigaya et al. | 474/18 |
| 2002/0160867 A1 | * | 10/2002 | Katou | 474/28 |
| 2005/0153805 A1 | * | 7/2005 | Koyama | 474/28 |

FOREIGN PATENT DOCUMENTS

DE          2652938        *    5/1978

OTHER PUBLICATIONS

SAE The Engineering Society for Advancing Mobility Land Sea Air and Space, International®, Surface Vehicle Information Report, SAE J2525, SAE Design Guideline: Metal Belt Drive Continuously Variable Ratio (CVT) Automatic Transmissions, Issued Mar. 2000.

* cited by examiner

*Primary Examiner*—Bradley T King
*Assistant Examiner*—Thomas W Irvin
(74) *Attorney, Agent, or Firm*—Quinn Law Group, PLLC

(57) ABSTRACT

A hybrid clamping mechanism for a belt continuously variable transmission (CVT) is disclosed. A pulley having adjustable belt-engagement surfaces allow for a variable effective diameter of the belt when about the pulley. A clamping spring disposed to bias the belt-engagement surfaces closer together exert a clamping force on the belt. A first hydraulic drive is disposed to assist the clamping force of the clamping spring, and a second hydraulic drive is disposed to oppose the clamping force of the clamping spring. The total clamping force at the belt results from the clamping spring, the first hydraulic drive, the second hydraulic drive, or any combination comprising at least one of the foregoing.

10 Claims, 3 Drawing Sheets

HYBRID CLAMPING MECHANISM FOR BELT CONTINUOUSLY VARIABLE TRANSMISSION AND METHOD OF USE THEREOF

BACKGROUND OF THE INVENTION

The present disclosure relates generally to vehicle transmissions, and particularly to a hybrid clamping mechanism for belt continuously variable transmission and method of use thereof.

Belt continuously variable transmissions (CVT's) transfer torque by means of the friction contacts between belt elements and pulley surfaces. A lack of a positive engagement, such as that found in a gear tooth arrangement for example, results in the application of substantial clamping forces being required at the belt element. To achieve variable clamping loads where required pressures may be controlled (modulated) as a function of input torque and speed ratio, hydraulic forces are employed. However, large clamp forces require a high capacity hydraulic pump, which consumes power and may negatively effect transmission efficiency and vehicle fuel economy. Accordingly, there is a need in the art for a belt CVT that overcomes these drawbacks.

SUMMARY OF THE INVENTION

Embodiments of the invention disclose a hybrid clamping mechanism for a belt continuously variable transmission (CVT). A pulley having adjustable belt-engagement surfaces allow for a variable effective diameter of the belt when about the pulley. A clamping spring disposed to bias the belt-engagement surfaces closer together exert a clamping force on the belt. A first hydraulic drive is disposed to assist the clamping force of the clamping spring, and a second hydraulic drive is disposed to oppose the clamping force of the clamping spring. The total clamping force at the belt results from the clamping spring, the first hydraulic drive, the second hydraulic drive, or any combination comprising at least one of the foregoing.

Other embodiments of the invention disclose a variator for a belt continuously variable transmission (CVT). The variator includes a driven hybrid clamping mechanism (HCM) and a driving HCM coupled via a v-belt. Each HCM includes a pulley having adjustable belt-engagement surfaces to allow for a variable effective diameter of the belt when about the pulley, a clamping spring disposed to bias the belt-engagement surfaces closer together to exert a clamping force on the belt, a first hydraulic drive disposed to assist the clamping force of the clamping spring, and a second hydraulic drive disposed to oppose the clamping force of the clamping spring. The driven pulley exerts a total clamping force at the belt in response to the clamping spring, the first hydraulic drive, the second hydraulic drive, or any combination comprising at least one of the foregoing, of the driven HCM. The driving pulley exerts a total clamping force at the belt in response to the clamping spring, the first hydraulic drive, the second hydraulic drive, or any combination comprising at least one of the foregoing, of the driving HCM.

Further embodiments of the invention disclose a method of varying the clamping force on a v-belt of a belt continuously variable transmission (CVT). The method includes: exerting a spring force via a first spring in a direction to produce a clamping force on the v-belt, the first spring force being equal to or less than about 50% of the total clamping force on the v-belt; exerting a first hydraulic force via a first hydraulic drive in a direction to assist the spring force on the v-belt, the first hydraulic force being equal to or greater than about 50% of the total clamping force on the v-belt; and, enabling the exertion of a second hydraulic force via a second hydraulic drive in a direction to oppose the clamping force on the v-belt.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a hybrid clamping mechanism (HCM) for a belt continuously variable transmission (CVT) having an adjustable pulley responsive to a clamping spring, a first hydraulic drive to assist the clamping spring, and a second hydraulic drive to oppose the clamping spring. While embodiments described herein depict a HCM having a v-shaped belt as an exemplary drive arrangement, it will be appreciated that the disclosed invention may also be applicable to other drive arrangements, such as a toroidal disk with rollers, for example.

Figure 1:
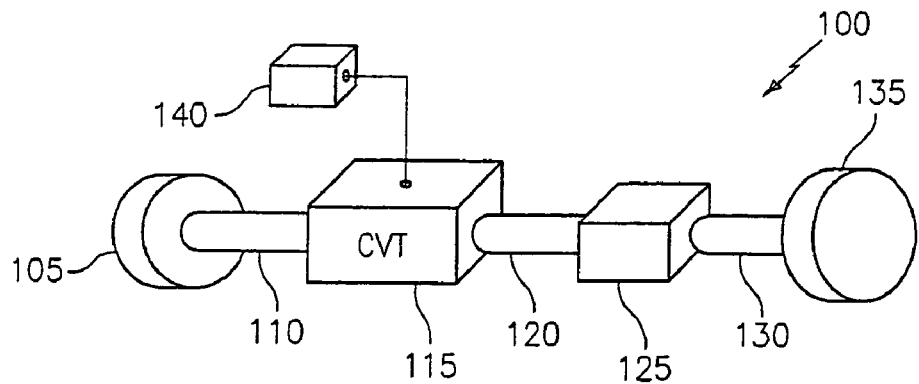
FIG. 1 depicts in isometric view an exemplary block diagram embodiment of a vehicle drive train for use in accordance with embodiments of the invention.
Figure 2:
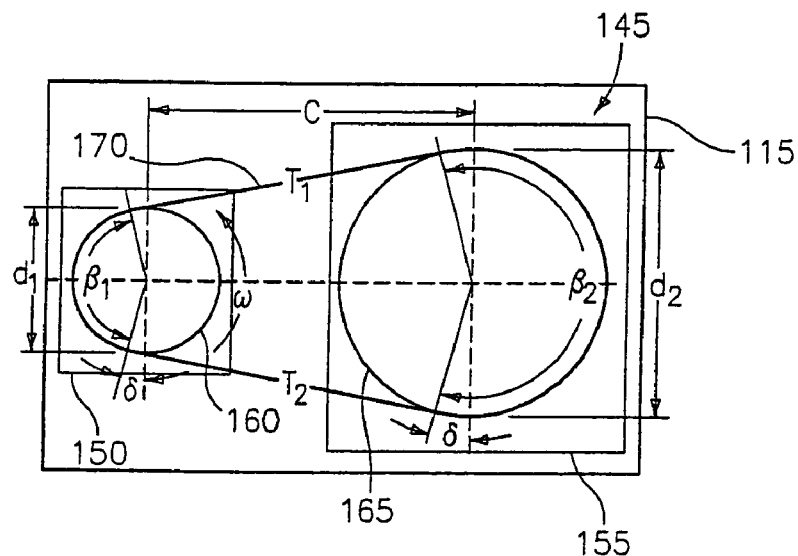
FIG. 2 depicts in front view an exemplary variator for use in the drive train of FIG. 1.

FIG. 1 is an exemplary block diagram embodiment of a vehicle drive train 100 having an engine 105, a transmission coupling 110, a CVT 115, a drive shaft 120, a drive coupling 125, a drive axle 130, and wheels 135. A control unit 140 provides electrical and hydraulic power to CVT 115 to enable the operation thereof. Exemplary components of control unit 140 include hydraulic control valves and lines. CVT 115 includes a variator 145, best seen by now referring to FIG. 2, that converts an input torque from engine 105 to an output torque directed to wheels 135 via a driving HCM 150 and a driven HCM 155, depicted generally in FIG. 2 and in more detail in FIGS. 4 and 5. Driving HCM 150 and driven HCM 155 each include an adjustable pulley 160, 165, respectively, which are coupled via a v-shaped drive belt 170. It should be noted that FIG. 2 depicts variator 145 in an underdrive condition and that the effective radii/diameter on both pulleys 160, 165 may be variable during operation.

Figure 3:
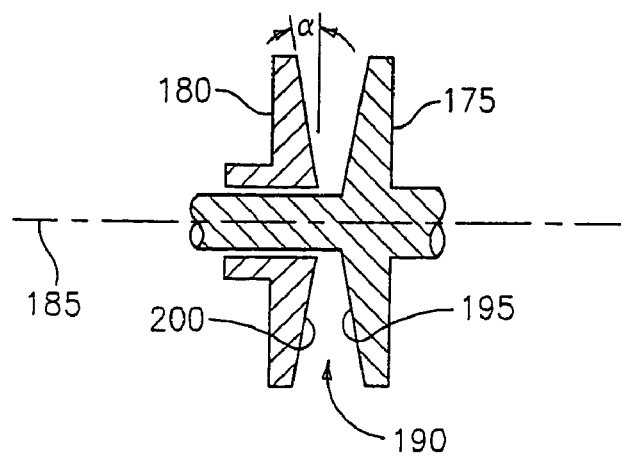
FIG. 3 depicts in cross section side view an exemplary block diagram representation of an adjustable pulley for use in accordance with embodiments of the invention.

Referring to FIG. 3, a side view cross section block diagram representation of adjustable pulley 160, 165 is depicted having a stationary portion 175 and a movable portion 180, with movable portion 180 being movable along axis 185. Axis 185 in FIG. 3 is represented in FIG. 2 as the centers of driving pulley 160 and driven pulley 165. The movement of movable portion 180 causes the width of v-groove 190 of adjustable pulley 160, 165 to either increase or decrease in size, causing v-belt 170 to travel up or down v-groove 190 in accordance with the magnitude of angle α. As v-groove 190 closes and v-belt 170 travels toward the outer diameter of adjustable pulley 160 or 165 via belt engagement surfaces 195, 200, so the circumferential path length of v-belt 170 increases about adjustable pulley 160 or 165. That is, the adjustable belt engagement surfaces 195, 200 of each respective pulley 160, 165 allow for a variable effective diameter of the belt 170 when about each respective pulley 160, 165. Depending on whether HCM is a driving HCM 150 or a driven HCM 155, the mechanism for adjusting v-groove 190 may differ, which will now be discussed with reference to FIGS. 4 and 5. For illustrative purposes, FIGS. 4 and 5 depict driven HCM 155 and driving HCM 150, respectively, with v-groove 190 in an open position, as illustrated above axis 185, and with v-groove 190 in a closed position, as illustrated below axis 185, with elements of the driving mechanisms acting on movable portion 180 being appropriately positioned, which will now be discussed in more detail.

Figure 4:
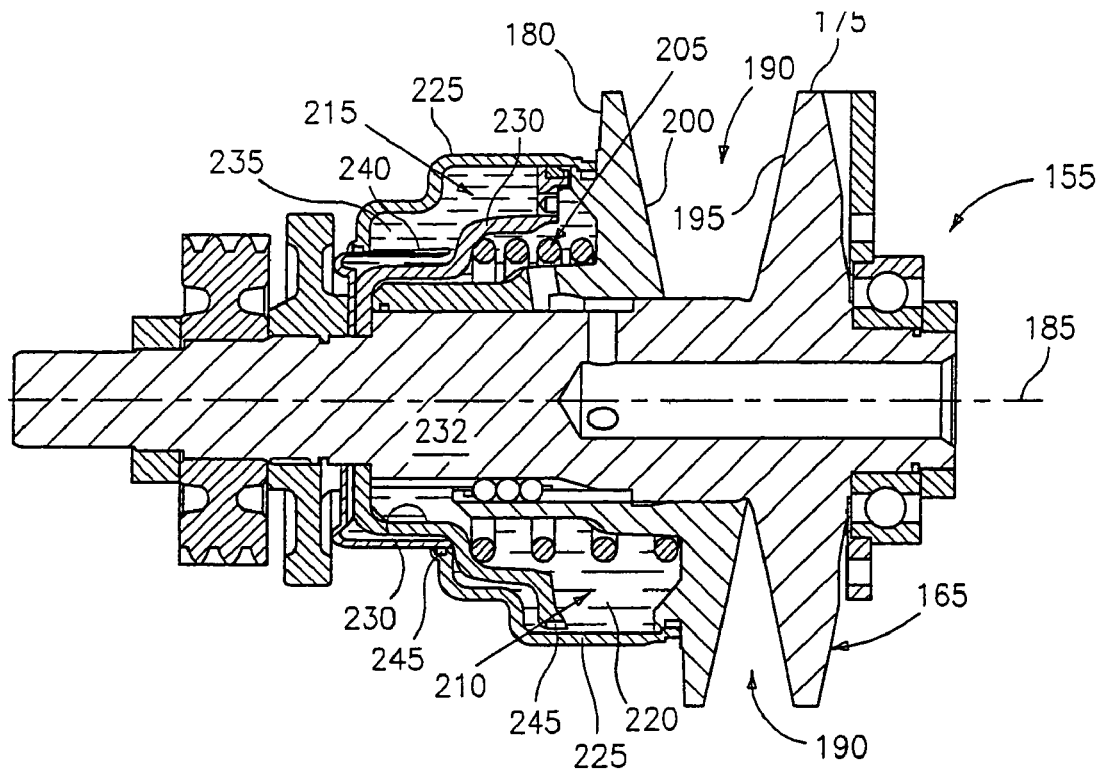
FIG. 4 depicts in cross section side view an exemplary driven hybrid clamping mechanism in accordance with embodiments of the invention.

Referring to FIG. 4, an exemplary driven HCM 155 is depicted having a driven adjustable pulley 165 with stationary and movable portions 175, 180 that open and close, as depicted above and below axis 185, to allow a change in the circumferential path length of v-belt 170 when about pulley 165. A clamping spring 205 is disposed within a clamping hydraulic drive 210 to bias belt-engagement surfaces 195, 200 closer together to exert a clamping force on v-belt 170. Clamping hydraulic drive 210 is arranged to assist the clamping force of clamping spring 205. A second hydraulic drive 215, referred to as an opposing hydraulic drive 215, is disposed to oppose the clamping force of clamping spring 205.

Clamping hydraulic drive 210 includes a fluid filled cavity 220 defined by movable portion 180, movable housing portion 225, stationary housing portion 230, and stationary housing portion 232. In an embodiment, clamping spring 205 is disposed within fluid filled cavity 220, which is filled with a hydraulic fluid. Opposing hydraulic drive 215 includes a fluid filled cavity 235, also filled with a hydraulic fluid, defined by movable housing portion 225, stationary housing portion 230, and stationary housing portion 240. Clamping hydraulic drive 210 and opposing hydraulic drive 215 are in fluid communication with control unit 140 via hydraulic couplings (not shown), which acts on command to pressurize and de-pressurize cavities 220 and 235. Hydraulic seals 245 serve to seal cavities 220, 235 as the defining surfaces move in response to the pressurization and de-pressurization of cavities 220, 235. The total clamping force at v-belt 170 about driven pulley 165 is a result of clamping spring 205, clamping hydraulic drive 210, and opposing hydraulic drive 215. While opposing hydraulic drive 215 may be de-pressurized and inactive during clamping, it may also have some residual built-up pressure or some transient pressure during or after a directional change in hydraulic loading. In an embodiment, 50% or more of the total clamping force at v-belt 170 about driven pulley 165 is provided by clamping hydraulic drive 210. In another embodiment, about 80% of the total clamping force is provided by clamping hydraulic drive 210.

Figure 5:
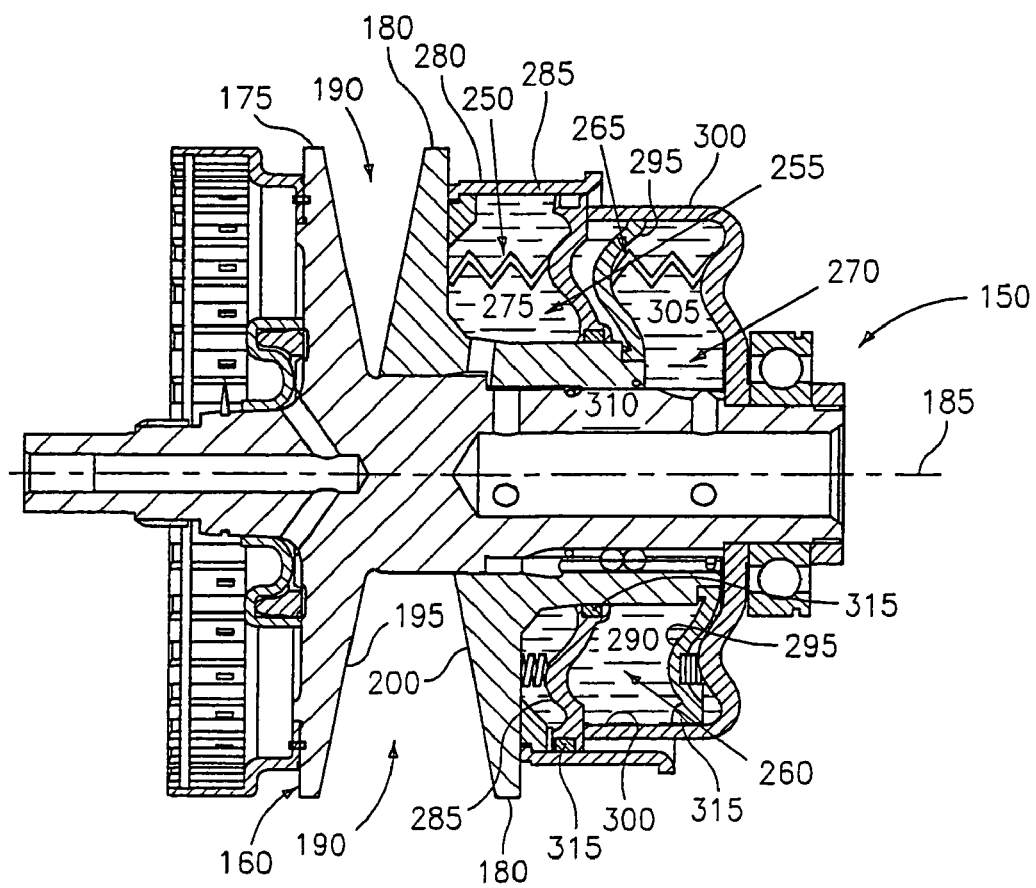
FIG. 5 depicts in cross section side view an exemplary driving hybrid clamping mechanism in accordance with embodiments of the invention.

Referring now to FIG. 5, an exemplary driving HCM 150 is depicted in a manner similar to that of driven HCM 155 of FIG. 4, wherein like elements are numbered alike. As depicted, driving HCM 150 includes a driving adjustable pulley 160 with stationary and movable portions 175, 180 that open and close, as depicted above and below axis 185, to allow a change in the circumferential path length of v-belt 170 when about pulley 160. A first clamping spring 250 is disposed within a first (clamping) hydraulic drive 255, which is arranged to assist the clamping force of first clamping spring 250. A second hydraulic drive 260, referred to as an opposing hydraulic drive 260, is disposed to oppose the clamping force of first clamping spring 250, and a second clamping spring 265 that is disposed within a third (clamping) hydraulic drive 270. Third hydraulic drive 270 is arranged to assist the clamping force of second clamping spring 265. First clamping spring 250, second clamping spring 265, first hydraulic drive 255, and third hydraulic drive 270, serve to bias belt-engagement surfaces 195, 200 closer together to exert a clamping force on v-belt 170, while second hydraulic drive 260 serves to oppose or reduce the clamping force on v-belt 170.

First (clamping) hydraulic drive 255 includes a fluid filled cavity 275 defined by movable portion 180, movable housing portion 280, and stationary housing portion 285. In an embodiment, first clamping spring 250 is disposed within fluid filled cavity 275, which is filled with a hydraulic fluid. Opposing hydraulic drive 260 includes a fluid filled cavity 290, filled with a hydraulic fluid, defined by stationary housing portion 285, movable portion 180, movable housing portion 295, and stationary housing portion 300. Third (clamping) hydraulic drive 270 includes a fluid filled cavity 305, filled with a hydraulic fluid, defined by movable housing portion 295, stationary housing portion 300, and stationary housing portion 310. As can be seen, movable housing portion 295 is arranged to accept a reaction force in two directions, that is, in both the closing and opening directions with respect to pulley 160. In an embodiment, second clamping spring 265 is disposed within fluid filled cavity 305. First (clamping) hydraulic drive 255, opposing hydraulic drive 260, and third (clamping) hydraulic drive 270, are in fluid communication with control unit 140 via hydraulic couplings (not shown), which acts on command to pressurize and de-pressurize cavities 275, 290 and 305. Hydraulic seals 315 serve to seal cavities 275, 290 and 305 as the defining surfaces move in response to the pressurization and de-pressurization of cavities 275, 290 and 305. The total clamping force at v-belt 170 about driving pulley 160 is a result of first clamping spring 250, first (clamping) hydraulic drive 255, opposing hydraulic drive 260, second clamping spring 265, and third (clamping) hydraulic drive 270. In an embodiment, 50% or more of the total clamping force at v-belt 170 about driving pulley 160 is provided by first and third hydraulic drives 255, 270. In another embodiment, about 80% of the total clamping force is provided by first and third hydraulic drives 255, 270.

In an embodiment, and referring to FIG. 4, clamping hydraulic drive 210 and opposing hydraulic drive 215 are arranged as a dual-acting (two-directional) piston.

In an alternative embodiment, and referring to FIG. 5, opposing hydraulic drive 260 is disposed between first and third (clamping) hydraulic drives 255, 270, and all three hydraulic drives 255, 260, 270 are arranged as a dual-acting (two-directional) piston.

While embodiments of the invention have been described employing compression springs disposed within fluid filled cavities of hydraulic drives, it will be appreciated that the scope of the invention is not so limited, and that the invention may also apply to spring forces applied at alternative locations.

While embodiments of the invention have been described with reference in FIG. 4 to driven HCM 155, and with reference in FIG. 5 to driving HCM 150, it will be appreciated that any embodiment falling within the scope of the invention disclosed herein may be employed for either a driven or a driving HCM.

In view of the foregoing, variator 145 performs a method of varying the clamping force on v-belt 170 of CVT 115 by: exerting a spring force via a first spring (205 or 250) in a direction to produce a clamping force on v-belt 170, wherein the spring force is equal to or less than about 50% of the total clamping force on v-belt 170; exerting a hydraulic force via a hydraulic drive (210 or 255) in a direction to assist the spring force on v-belt 170, the hydraulic force being equal to or greater than about 50% of the total clamping force on v-belt 170; and, enabling via control unit 140 the exertion of a second hydraulic force via a second hydraulic drive (215 or 260) in a direction to oppose the clamping force on v-belt 170. In an embodiment, the spring force is equal to about 20% of the total clamping force on v-belt 170, and the hydraulic clamping force is equal to about 80% of the total clamping force on v-belt 170.

In an embodiment, variator 145 may further perform the above-noted method by exerting a hydraulic force via first hydraulic drive 255 in combination with a third hydraulic drive 270, in a direction to assist the clamping force on v-belt 170. Here, the spring force may be equal to about 20% of the total clamping force on the v-belt, and the hydraulic force may be equal to about 80% of the total clamping force on v-belt 170. In an embodiment with first and third hydraulic drives 255, 270, the above-noted spring force may be exerted via first spring 250 in combination with a second spring 265 in a direction to produce a clamping force on v-belt 170, wherein first spring 250 acts in concert with first hydraulic drive 255 and second spring 265 acts in concert with third hydraulic drive 270.

Variator 145 may further perform the method of varying the clamping force on v-belt 170 of CVT 115 by: reducing the clamping hydraulic force and exerting an opposing hydraulic force via second hydraulic drive (215 or 260) in a direction to oppose the clamping force on v-belt 170.

Figure 6:
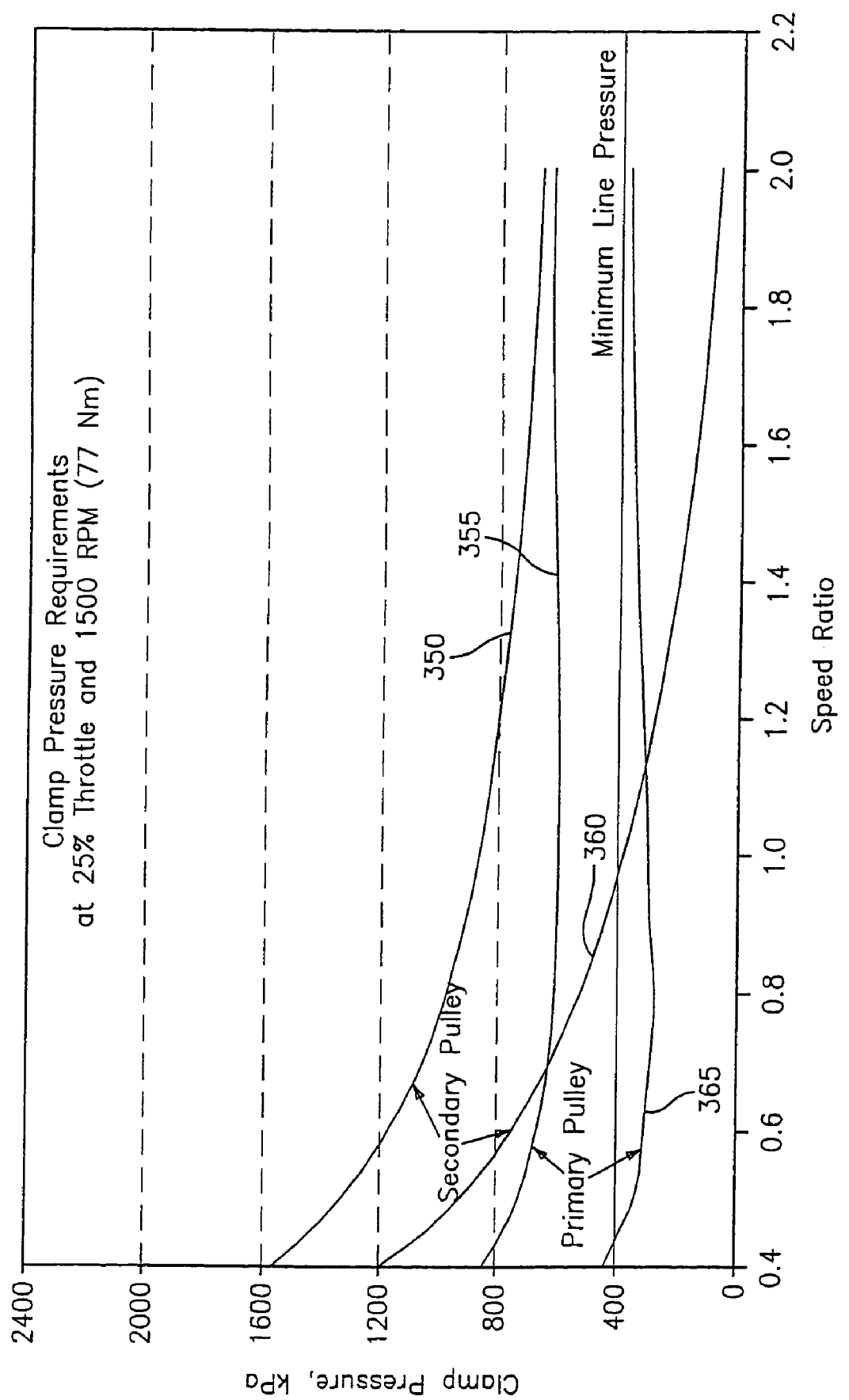
FIG. 6 depicts graphical representations of performance characteristics with and without the benefit of embodiments of the invention.

Referring now to FIG. 6, several plots of clamping pressure (in kilo-Pascals (kPa)), as a function of speed ratio (dimensionless value of output-to-input speed at CVT 115) are presented. For all plots, the clamp pressure requirements are plotted at 1500 rpm (revolutions per minute) engine speed and 25% throttle, which in an exemplary embodiment produces 77 Nm (newton meters) of engine torque. These operating characteristics are typical for steady state, highway speed operation. Plotted lines 350 and 355 illustrate the performance of a non-HCM arrangement, and plotted line 360 and 365 illustrate the performance of a HCM arrangement in accordance with embodiments of the invention. Lines 350 and 360 illustrate the performance of a driven pulley 165, such as that depicted in FIG. 4, and lines 355 and 365 illustrate the performance of a driving pulley 160, such as that depicted in FIG. 5. As can be seen from FIG. 6, a substantial reduction in required clamping pressure is achievable by employing a HCM system in accordance with embodiments of the invention. More specifically, and for given piston areas of "x" m$^2$ (square meters) for the driven pulley and "y" m$^2$ for the driving pulley, at a speed ratio of about 1:1, the non-HCM CVT would require over 800 kPa of driven pulley clamping, while the HCM CVT would require less than 400 kPa of driven pulley clamping. For this example, 400 kPa is the minimum pump pressure of CVT 115. It will be appreciated that specific piston areas "x" and "y" may be a matter of design choice and that the invention disclosed herein is not intended to be limited in any way to just one design choice. For different piston areas, clamping springs for HCM (150 or 155) would be selected to provide a satisfactory clamping pressure below the minimum pump pressure at defined speed ratios and input torques.

In an exemplary embodiment, clamping springs 205, 250, 265 are designed to provide adequate clamping in the absence of hydraulic assist at mid-range torque values, such as 125 Nm for example. For input torques less than 125 Nm, an opposing hydraulic drive 215, 260 may be active, while for input torques greater than 125 Nm, clamping hydraulic drives 210, 255, 270 may be active. It will be appreciated that a specific threshold torque value of 125 Nm is for exemplary purposes only, and is not intended to be limiting in any way.

As herein disclosed, HCM (150 or 155) provides an overall clamping force requirement for slip-free operation of a belt CVT that combines the clamping force from a compression spring with that from hydraulic clamping. In some cases, the majority of the clamping force may be provided by the compression spring, with the hydraulic force being used only to trim the total clamping force to maintain overall required force levels. By utilizing clamping and opposing hydraulic drives, the requirement of a high-pressure pump may be downsized, which in turn should reduce transmission losses. However, for optimal overall efficiency gains, it may be preferable to design the compression spring based on a preferred duty cycle, thereby resulting in a total clamping force being composed of about a 20% spring force rather than about a 50% spring force.

While embodiments of the invention have been described employing about 20% or about 50% or about 80% of the total clamping load, it will be appreciated that these percentages are exemplary only and are not intended to be limiting in any way. For example: about 20% may refer to a range equal to or greater than about 10% and equal to or less than about 30%; about 50% may refer to a range equal to or greater than about 40% and equal to or less than about 60%; and, about 80% may refer to a range equal to or greater than about 70% and equal to or less than about 90%.

As disclosed, some embodiments of the invention may include some of the following advantages: a reduction of hydraulic axial loading at pulleys of a belt CVT, thereby reducing parasitic losses due to pump pressure; a reduction of maximum hydraulic force requirement of about 50% at mid-range torques; and, a reduction in transmission hydraulic line pressure and pump pressure requirement, thereby improving fuel economy.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A variator for a belt continuously variable transmission (CVT), the variator comprising:
   a driven hybrid clamping mechanism (HCM) and a driving HCM coupled via a v-belt;
   each HCM comprising:
   a pulley having adjustable belt-engagement surfaces to allow for a variable effective diameter of the belt when about the pulley;
   a clamping spring disposed to bias the belt-engagement surfaces closer together to exert a clamping force on the belt;

a first hydraulic drive disposed to assist the clamping force of the clamping spring, the first hydraulic drive including a moveable portion, a moveable housing portion, a first stationary housing portion and a second stationary housing portion; and a second hydraulic drive disposed to oppose the clamping force of the clamping spring, the second hydraulic drive including the moveable housing portion, the first stationary housing portion and a third stationary housing portion;

wherein the driven pulley exerts a total clamping force at the belt in response to the clamping spring, the first hydraulic drive, the second hydraulic drive, or any one of the foregoing, of the driven HCM;

wherein the driving HCM further comprises a third hydraulic drive disposed to assist the clamping force of the driving HCM clamping spring, and the driving HCM second hydraulic drive is disposed between the first and the third hydraulic drives of the driving HCM;

wherein the clamping spring of the driving HCM includes a first clamping spring disposed at the first hydraulic drive, and a second clamping spring disposed at the third hydraulic drive;

wherein the driving pulley exerts a total clamping force at the belt in response to the first clamping spring, the second clamping spring, the first hydraulic drive, the second hydraulic drive, the third hydraulic drive, or any combination of the foregoing, of the driving HCM; and wherein the driven HCM first hydraulic drive provides equal to or greater than about 50% of the total clamping force at the belt at the driven pulley, and the driving HCM first hydraulic drive provides equal to or greater than about 50% of the total clamping force at the belt at the driving pulley.

2. The variator of claim 1, wherein:
the driving HCM clamping spring comprises a first clamping spring and a second clamping spring.

3. The variator of claim 1, wherein the driving HCM first and second hydraulic drives are portions of a dual-acting piston.

4. The variator of claim 1, wherein the driven HCM first and second hydraulic drives are portions of a dual-acting piston.

5. The variator of claim 4, wherein the driven HCM first hydraulic drive provides about 80% of the total clamping force at the belt at the driven pulley; and
the driving HCM first hydraulic drive provides about 80% of the total clamping force at the belt at the driving pulley.

6. A method of varying the clamping force on a v-belt of a belt continuously variable transmission (CVT), the method comprising:
exerting a spring force at a driving hybrid clamping mechanism (HCM) via a clamping spring in a direction to produce a clamping force on the v-belt;
exerting a first hydraulic force at the driving HCM via a first hydraulic drive in combination with a third hydraulic drive in a direction to produce a clamping force on the v-belt;
enabling the exertion of a second hydraulic force at the driving HCM via a second hydraulic drive in a direction to oppose the clamping force on the v-belt;
exerting a spring force at a driven hybrid clamping mechanism (HCM) via a clamping spring in a direction to produce a clamping force on the v-belt;
exerting a first hydraulic force at the driven HCM via a first hydraulic drive in a direction to produce a clamping force on the v-belt;
enabling the exertion of a second hydraulic force at the driven HCM via a second hydraulic drive in a direction to oppose the clamping force on the v-belt
wherein:
the exerting a spring force via the clamping spring at the driving HCM further comprises exerting a spring force via a first spring and a second spring in a direction to produce a clamping force on the v-belt, the first spring acting in concert with the first hydraulic drive and the second spring acting in concert with the third hydraulic drive;
the driving HCM exerts a total clamping force at the belt in response to the first spring, the second spring, the first hydraulic drive, the second hydraulic drive, the third hydraulic drive, or any combination of the foregoing, of the driving HCM;
the driven HCM exerts a total clamping force at the belt in response to the clamping spring, the first hydraulic drive, the second hydraulic drive, or any combination of the foregoing, of the driving HCM; and
the first hydraulic force at the driven HCM provides equal to or greater than about 50% of the total clamping force at the v-belt at the driven pulley, and the first hydraulic force at the driving HCM provides equal to or greater than about 50% of the total clamping force at the v-belt at the driving pulley.

7. The method of claim 6, wherein:
the spring force is equal to about 20% of the total clamping force on the v-belt; and
the first hydraulic force is equal to about 80% of the total clamping force on the v-belt.

8. The method of claim 6, wherein:
the spring force is equal to about 20% of the total clamping force on the v-belt; and
the first hydraulic force is equal to about 80% of the total clamping force on the v-belt.

9. The method of claim 6, wherein the exerting a spring force further comprises:
exerting a spring force via the first spring in combination with a second spring in a direction to produce a clamping force on the v-belt, the first spring acting in concert with the first hydraulic drive and the second spring acting in concert with the third hydraulic drive.

10. The method of claim 6, further comprising:
reducing the first hydraulic force and exerting a second hydraulic force via the second hydraulic drive in a direction to oppose the clamping force on the v-belt.

* * * * *